United States Patent

Isozumi

[11] Patent Number: 5,162,683
[45] Date of Patent: Nov. 10, 1992

[54] STARTER MOTOR WITH ROTOR BALANCING

[75] Inventor: Shuzou Isozumi, Himeji, Japan

[73] Assignee: Mitsubishi Denki Kabushiki Kaisha, Tokyo, Japan

[21] Appl. No.: 758,361

[22] Filed: Sep. 10, 1991

Related U.S. Application Data

[63] Continuation of Ser. No. 501,562, Mar. 30, 1990, abandoned.

[30] Foreign Application Priority Data

Mar. 31, 1989 [JP] Japan ............. 1-38731[U]

[51] Int. Cl.⁵ ............. H02K 7/118; H02K 15/16; G01M 1/00; F02N 11/00
[52] U.S. Cl. ............. 310/83; 310/81; 310/261; 29/598; 74/6; 74/573 R
[58] Field of Search ........ 310/261, 262, 271, 81, 310/83; 74/6, 7 C, 7 A, 573 R; 29/598, 901

[56] References Cited

U.S. PATENT DOCUMENTS

| | | | |
|---|---|---|---|
| 1,731,922 | 10/1929 | Eaton | 29/901 |
| 3,154,705 | 10/1964 | Essenburg | 310/51 |
| 3,262,000 | 7/1966 | Rediger et al. | 310/261 |
| 3,965,382 | 6/1976 | McCrosky et al. | 310/261 |
| 4,080,541 | 3/1978 | Mazzorana | 310/83 |
| 4,175,237 | 11/1979 | Mazzorana | 290/38 R |
| 4,295,069 | 10/1981 | Givan et al. | 310/83 |
| 4,350,236 | 9/1982 | Stahlhuth | 74/7 C |
| 4,613,761 | 9/1986 | Yabunaka | 290/36 R |
| 4,642,886 | 2/1987 | Muck et al. | 74/573 R |
| 4,737,654 | 4/1988 | Morishitz et al. | 290/48 |
| 4,776,224 | 10/1988 | Maezawa | 74/6 |
| 4,825,095 | 4/1989 | Morishita et al. | 249/48 |
| 4,893,044 | 1/1990 | Bush et al. | 310/261 |
| 4,896,066 | 1/1990 | Tomite | 310/214 |
| 4,929,858 | 5/1990 | Konishi | 310/83 |
| 4,933,583 | 6/1990 | Ripplinger | 310/156 |

Primary Examiner—William H. Beha, Jr.
Assistant Examiner—D. R. Haszko
Attorney, Agent, or Firm—Sughrue, Mion, Zinn, Macpeak and Seas

[57] ABSTRACT

A starter motor including an electric motor (1) having an armature (1b) balanced in terms of rotation, thereby preventing the generation of a centrifugal force and its application to a bearing (8).

3 Claims, 2 Drawing Sheets

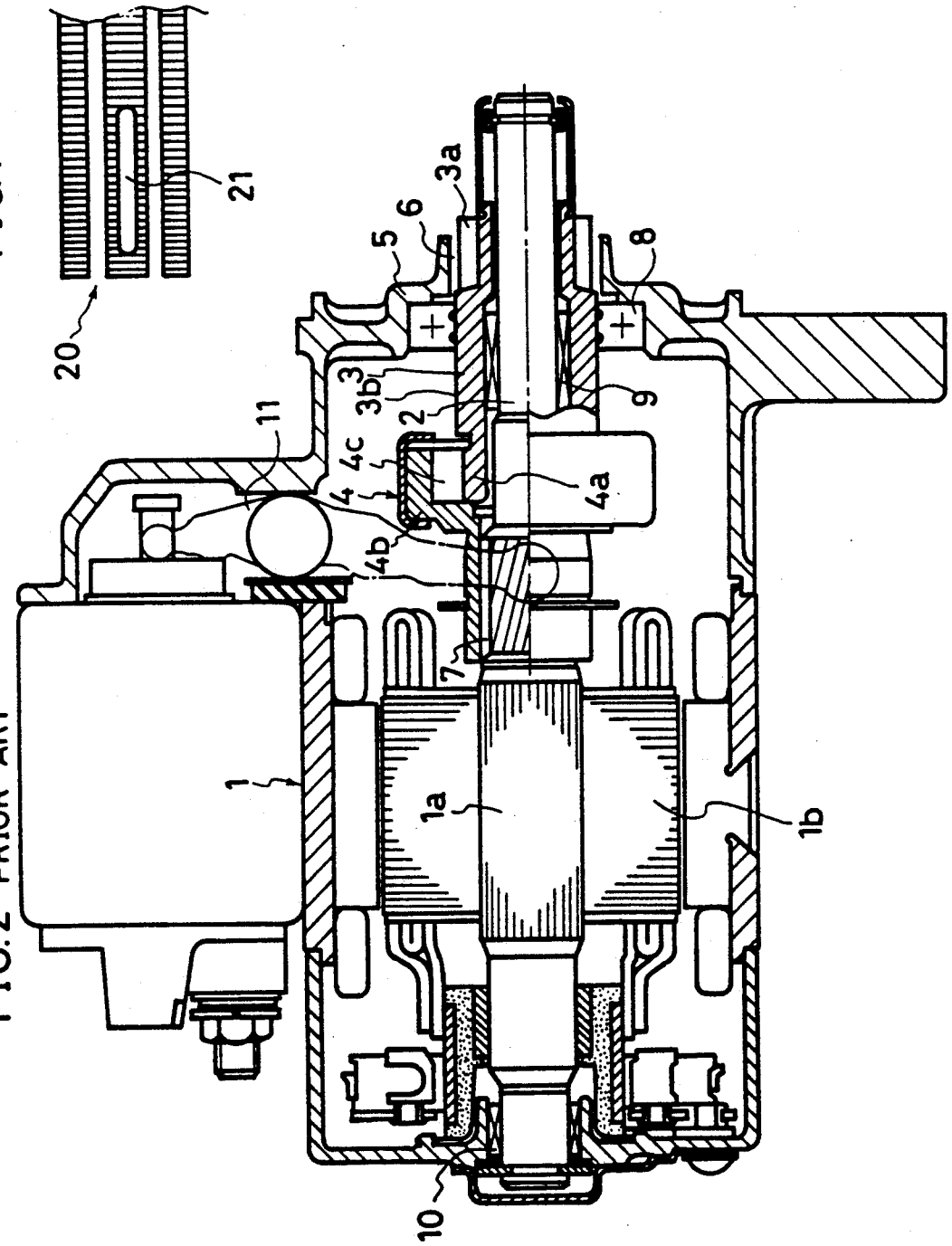

STARTER MOTOR WITH ROTOR BALANCING

This is a continuation of application Ser. No. 07/501,562, filed Mar. 30, 1990, abandoned.

BACKGROUND OF THE INVENTION

1. Field of the Invention

The present invention relates generally to starter motors and, more particularly, to an overhang starter motor for starting a vehicle engine.

2. Description of the Prior Art

Overhang starter motors for starting vehicle engines are well known. As shown in FIG. 2, such an overhand starter motor generally consists of a d.c. motor 1 for generating rotary power to start an engine and a pinion moving cylinder 3 slidably fitted over the output shaft or extended portion 2 of an armature shaft 1a and having a pinion portion 3a at the front end and a clutch inner member 4a of an overrunning clutch 4 at the rear end. The output shaft 2 is supported by the front frame 5 via the pinion moving cylinder 3 such that the pinion portion 3a is movable through an opening 6 of the front frame 5 according to the sliding movement of the pinion moving cylinder 3.

The overrunning clutch 4 is slidably fitted over the output shaft 2 such that the rear cylindrical portion of a clutch outer member 4b engages with a helical spline 7 of the output shaft 2 so that the rotary power is transmitted to the clutch inner member 4a via a roller 4c. The circumferential surface of the pinion moving cylinder 3, which is integral with the clutch inner member 4a, forms a sliding surface 3b slidably supported by a bearing 8 which is fitted in the front frame 5.

In such an overhang starter motor, there can be a delay in return of the pinion moving cylinder 3 or noise generated when current to the d.c. motor 1 is cut off. In some engines, the rotation of the pinion moving cylinder 3 by the pinion portion 3a is so fast that the over running clutch 4 is burned. Although the cause for such incidents is unclear, there is a great demand for solving such problems.

SUMMARY OF THE INVENTION

Accordingly, it is an object of the invention to provide a starter motor free of a delay in return of the pinion moving cylinder when current to the motor is cut off.

According to the invention there is provided a starter motor including an electric motor which consists of an armature shaft and an armature with balanced rotation mounted on the armature shaft; an overrunning clutch which consists of a clutch outer member slidably fitted over an output shaft extending from the armature shaft and engaging with the output shaft with a helical spline for rotation and a clutch inner member to which rotation of the clutch outer member is transmitted via a roller; and a pinion moving cylinder integral with the clutch inner member and having at its front end a pinion portion which engages and disengages a ring gear of an engine and at its intermediate portion a sliding surface which is slidably supported by a bearing provided on a front frame.

According to the invention, an imbalance in rotation of the armature is adjusted to minimize the generation of a centrifugal force so that the reactive force applied to the bearing for supporting the pinion moving cylinder is minimized, resulting in the reduced force for returning the pinion moving cylinder.

The above and other objects, features, and advantages of the invention will become more apparent from the following description when taken in conjunction with the accompanying drawings.

BRIEF DESCRIPTION OF THE DRAWINGS

FIG. 1 is a plan view of part of an armature for a starter motor according to an embodiment of the invention;

FIG. 2 is a sectional view of a conventional overhang starter motor; and

DESCRIPTION OF THE PREFERRED EMBODIMENT

Figure 3:
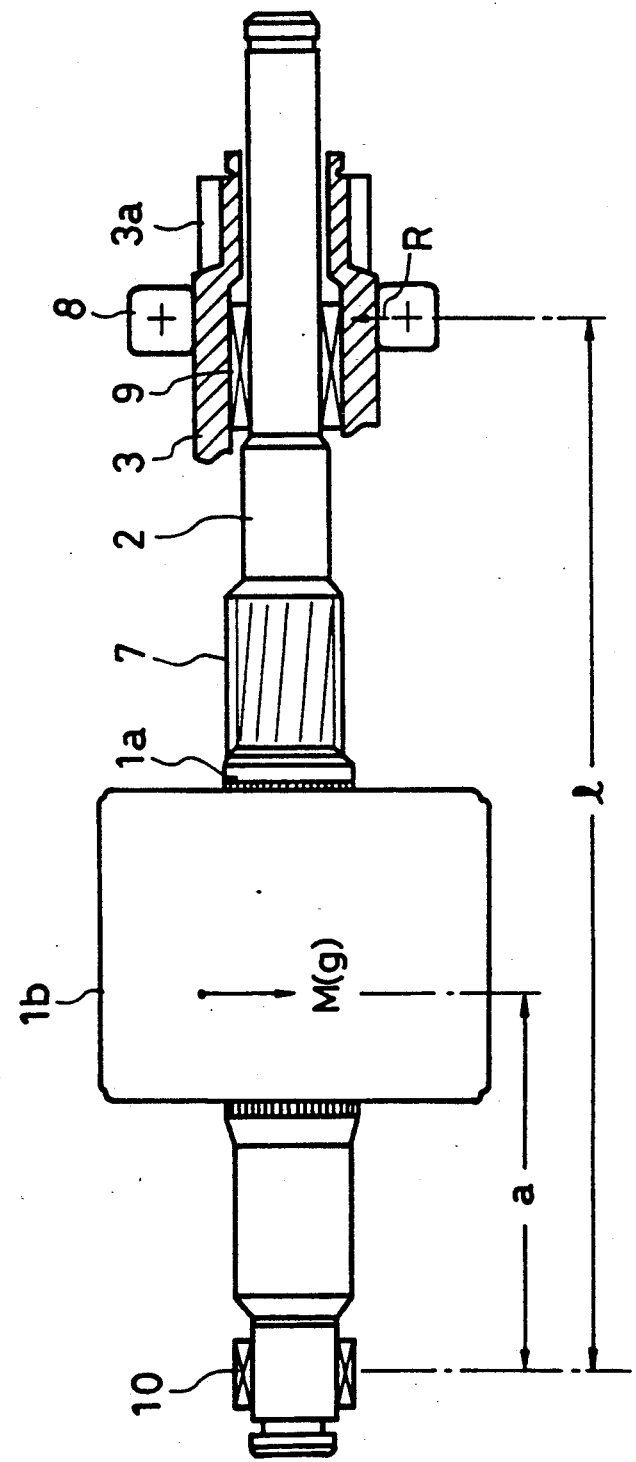
FIG. 3 is a side view of the necessary part of the overhang starter motor of FIG. 2 to show a reactive force applied to the bearing.

According to the invention it has been discovered that the aforementioned problems are produced by the reactive force applied to the bearing 8 for slidably supporting the pinion moving cylinder 3 and that this reactive force comes from a centrifugal force produced by an imbalance in rotation of the armature 1b.

More specifically, as shown in FIG. 3, if there is an imbalance in mass M of the core, the centrifugal force generated by rotation of the armature 1b is $Mr\omega^2$ wherein r is the radius of the core and $\omega$ is the angular velocity. Consequently, a reactive force R is generated on the bearing 9 within the pinion moving cylinder 3. If 1 and a are the distance between the front bearing 8 and the rear bearing 10 and the distance between the rear bearing 10 and the point where an imbalance is generated by rotation of the armature 1b, respectively, the reactive force is given by $$R = a/1 \times Mr\omega^2.$$

This reactive force is transmitted to the front bearing 8 via the pinion moving cylinder 3.

When the engine starts, little or no load is applied to the d.c. motor 1 by the action of the overrunning clutch 4 so that the armature 1b rotates at high speeds until the power is cut off. Consequently, the reactive force R resulting from the centrifugal force generated by an imbalance of the armature 1b is applied to the bearing 8. The return force F of a shift lever 11 for returning the pinion moving cylinder 3 should be $F > R \times \mu$ wherein $\mu$ is the friction coefficient of the circumferential surface 3b of the pinion moving cylinder 3. It has been discovered that if the return force F, which also includes a return force by the helical spline 7, is less than $R \times \mu$, there is a delay in return of the pinion moving cylinder 3.

Thus, in order to prevent the large reactive force R to the bearing 8, it is necessary to reduce the imbalance in rotation of the armature 1b which give rise to the reactive force R. According to the invention, as shown in FIG. 1, the core portion between the slots of an armature 20 which is found imbalanced by a measuring instrument is provided with a correction treatment or is milled or drilled at 21 to offset the imbalance. Alternatively, a balancer, such as putty, is attached to the armature 20 to adjust the rotary balance.

Thus, even if the armature 20 rotates at high speeds, there is little or no portion which produces a rotary imbalance and, thus, a centrifugal force, resulting in the reduced reaction force R on the bearing 8. Consequently, the return force F for returning the pinion moving cylinder 3 is reduced according to the aforementioned formula F>R×μ. As a result, the return force by both the helical spline 7 and the shift lever 11 become much greater than the return force necessary for returning the pinion moving cylinder 3, thus eliminating a delay of the pinion moving cylinder 3. In addition, there is little or no danger of producing noise, or burning the overrunning clutch due to the high-speed rotation of the pinion, thus damaging the d.c. motor.

Alternatively, the pinion portion 3a integral with the pinion moving cylinder 3 may be replaced by a separate pinion which is attached to the pinion moving cylinder 3. It is preferred that the bearing 9 is provided to overlap, when the pinion moving cylinder 3 is moved, the front bearing 8 to prevent vibrations of the shaft. It is also preferred that a groove is formed on the inner race of the bearing 8 to provide a grease reservoir, thereby reducing the friction coefficient of the sliding surface 3b of the pinion moving cylinder 3. The bearing 8 may be a sleeve or ball bearing.

As has been described above, according to the invention, the rotary balance of the armature is adjusted to minimize the centrifugal force so that the reactive force on the bearing for pinion moving cylinder is minimized, thereby preventing not only a delay in return of the pinion moving cylinder but also noise caused by the unbalanced high speed rotation. In addition, the radial load on the respective bearings due to the imbalance is reduced, resulting in the increased service life.

I claim:

1. A starter motor, comprising:
  a) an electric motor including an armature shaft (1a,2) and an armature (1b) mounted on said armature shaft, said armature comprising a core extending in an axial direction of said shaft and defining a plurality of slots for accommodating armature windings;
  b) an overrunning clutch including a clutch outer member (4b) with a reduced rear portion slidably engaging said armature shaft via helical splines (7) for rotation therewith, and a clutch inner member (4a) to which rotation of said clutch outer member is transmitted via rollers (4c);
  c) a pinion displacement cylinder (3) integral with said clutch inner member and having at a front end thereof a pinion (3a) adapted to engage and disengage a ring gear of an engine, and defining at an intermediate portion thereof a sliding surface (3b) which is slidably supported by a bearing (8) mounted in a front frame (5);
  d) means (11) for displacing the pinion displacement cylinder and attendantly the pinion outwardly from the energization of the starter motor; and
  e) means for preventing a delay in the inward, return displacement of the pinion displacement cylinder and pinion upon the deenergization of the starter motor and when rotating at a high speed due to a radially inwardly directed reactive force applied to the cylinder by said bearing in response to a radially outwardly directed centrifugal force produced by an imbalance in the rotation of the armature, said preventing means comprising armature balance restoration means provided on said core at a discrete circumferential position between a pair of said slots and extending in the axial direction of the armature shaft where an unbalanced portion is found, thereby establishing a balanced rotation of said armature to attendantly eliminate said centrifugal force and thus said reactive force.

2. A starter motor according to claim 1, wherein said balance restoration means comprises a material removal zone (21) whereat core material creating an armature imbalance has been removed in the axial direction of the armature shaft.

3. A starter motor according to claim 1, wherein said balance restoration means comprises balancing weight means attached to said unbalanced portion of the core in the axial direction of the armature shaft.

* * * * *